United States Patent [19]

Chern

[11] Patent Number: 4,863,182
[45] Date of Patent: Sep. 5, 1989

[54] SKATE BIKE

[76] Inventor: Jiuun F. Chern, No. 31, Lane 40, Pei-Yang Rd., Feng-Yun City, Taichung Hsien, Taiwan

[21] Appl. No.: 218,914

[22] Filed: Jul. 14, 1988

[51] Int. Cl.$^4$ .............................................. B62K 5/04
[52] U.S. Cl. .................................... 280/266; 280/282
[58] Field of Search ............... 280/7.1, 7.11, 87.04 R, 280/87.04 A, 87.01, 87.02 R, 11.28, 266, 282, 291, 205, 11.1 BT; D21/71, 86, 81, 227; D12/107

[56] References Cited

U.S. PATENT DOCUMENTS

| 2,545,543 | 3/1951 | Bottrill | 280/818 |
| 4,523,770 | 6/1985 | Lee | 280/266 |
| 4,657,272 | 4/1987 | Davenport | 280/266 |
| 4,771,651 | 9/1988 | Haro | 280/291 |

FOREIGN PATENT DOCUMENTS 244495  9/1946  Switzerland ...................... 280/291

Primary Examiner—Charles A. Marmor
Assistant Examiner—Richard Camby
Attorney, Agent, or Firm—Bacon & Thomas

[57] ABSTRACT

A skate bike including a frame; a spring seat saddle connected to an upper part of the frame; a wheel having a central axle connected to a lower part of the frame; a pair of pedals provided on either side of the wheel; a pair of supporting shafts pivotally provided on the frame at suitable position to define a support for feet of a passenger; and an auxiliary wheel set provided on the frame at a suitable position. The skate bike is effective as an unicycle and also effective as an ice scooter or a grass scooter when used in conjunction with a pair of ski poles.

16 Claims, 4 Drawing Sheets

SKATE BIKE

BACKGROUND OF THE INVENTION

The present invention relates generally to sporting devices. In particular, the present invention relates to a skate bike which is alternatively effective as a snow scooter or a grass scooter and is alternatively effective as an unicycle.

More particularly, the present invention relates to a skate bike comprising a configuration having a wheel, an auxiliary wheel set, and a pair of pedals. The skate bike is thus selectively effective as an unicycle and is selectively effective as a skating device such as snow scooter, a grass scooter or a skate board when used in conjuction with a pair of ski poles.

Various sporting devices of different constructions have been developed to meet the general and/or particular requirement of sportsmen and other users. They are basically classified into two types, namely, indoor sport devices and outdoor sport devices. Heretofore, indoor sporting devices are often static in construction or immovable with respect to the floor while outdoor sporting devices are often monotonous in construction and unalterable in the manner of utilization thereof. General snow skiing devices or grass skiing devices, although interesting and entertaining, require particular sports field or area. Therefore, said sporting devices are not so versatile due to their limited use and restricted applicable area.

SUMMARY OF THE INVENTION

It is a primary object of the present invention to provide a skate bike which is effective as a snow scooter or a grass scooter when used in conjunction with a pair of ski poles, and at the same time, is effective as an unicycle.

It is another object of the present invention to provide a skate bike which is fun when used and its utilization is not restricted by available space or area.

Other objects and advantages of the present invention will become apparent to those skilled in the art upon reading the detailed description provided hereinbelow with reference to the attached drawings.

DETAILED DESCRIPTION OF THE PREFERRED EMBODIMENTS

Figure 1:
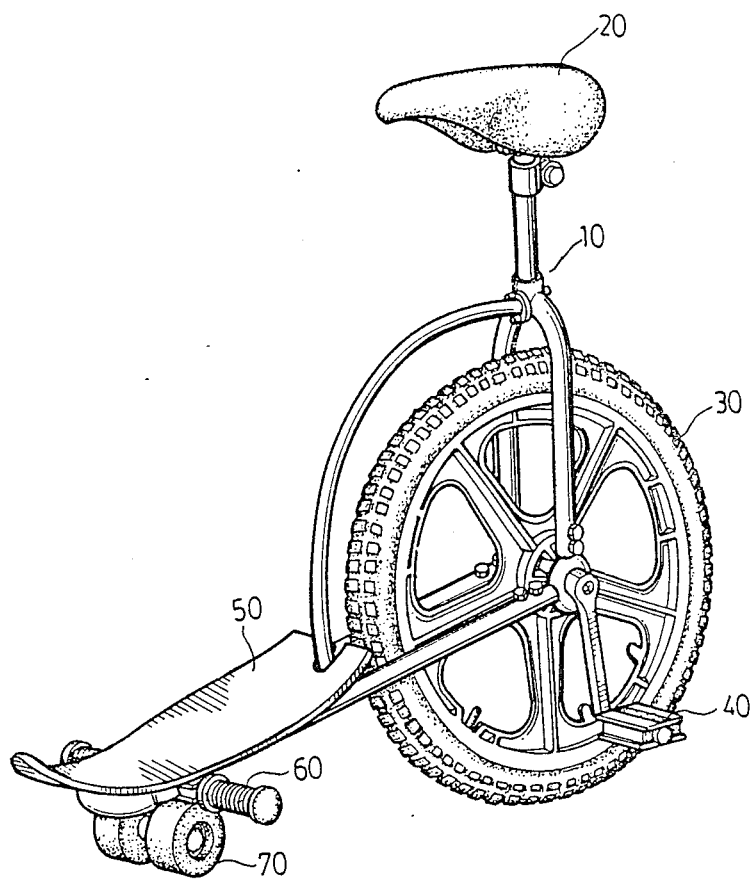
FIG. 1 is a perspective view of a skate bike in accordance with the present invention.

Referring to the drawings and initially to FIG. 1, it can be seen that a skate bike constructed in accordance with the present invention comprises a frame 10, a spring seat saddle 20 connected to an upper part of the frame 10, a wheel 30 connected to a lower part of the frame 10, a pair of pedals 40 provided on either side of the wheel 30, a cover plate 50, a pair of supporting shafts 60, and an auxiliary wheel set 70. The skate bike is adapted to be selectively used in conjunction with a pair of ski poles 80.

Figure 2:
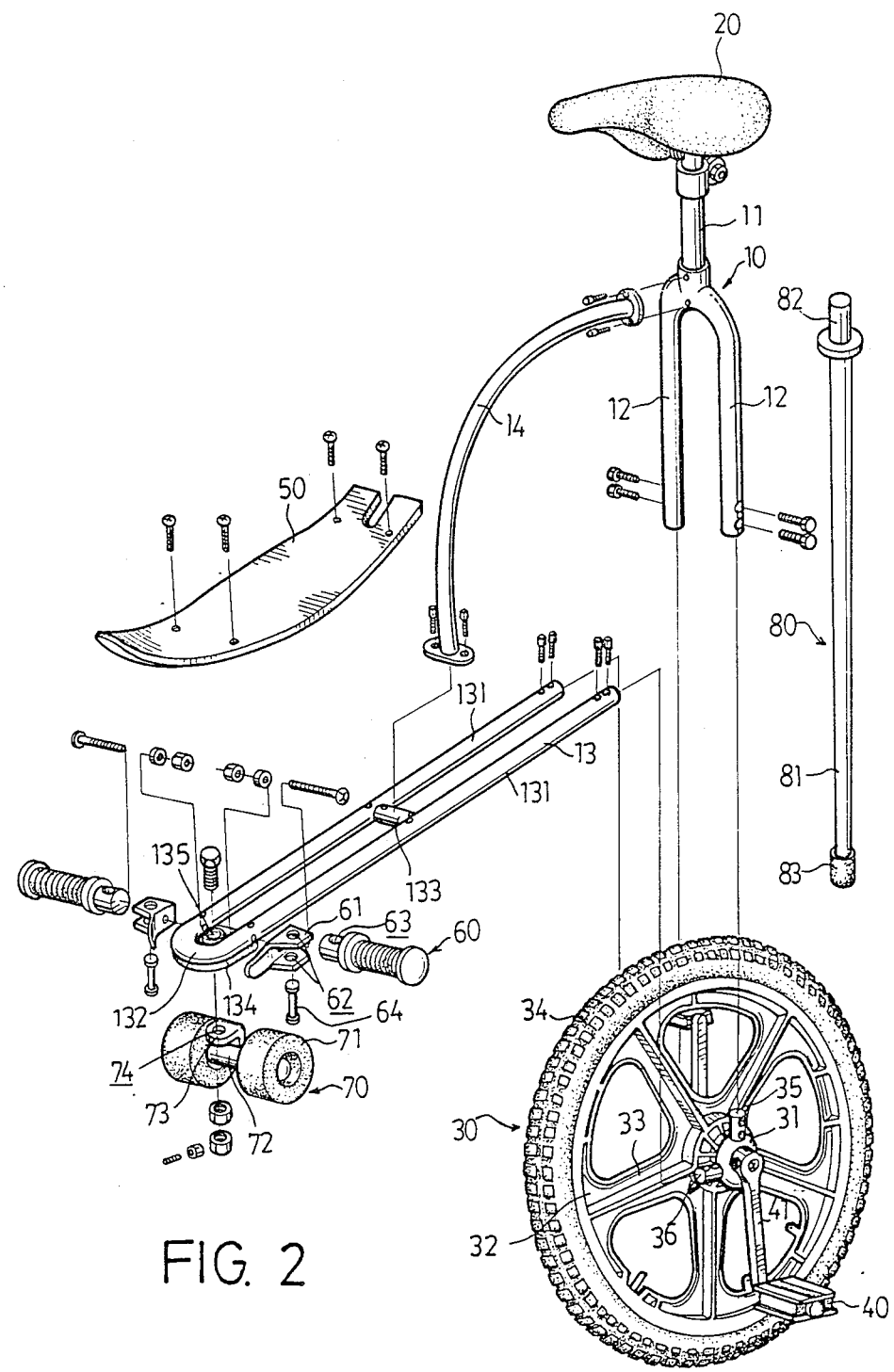
FIG. 2 is an exploded view of the skate bike shown in FIG. 1.

Referring next to FIG. 2, it can be seen that the frame 10 includes a seat tube 11 with its upper end connected to the spring seat saddle 20, two downwardly extending seat stays 12 jointed to a lower end of the seat tube 11 and connected to a central axle 31 of the wheel 30, a substantially horizontally extending U-shaped tube 13 having two straight portions 131 with one end thereof connected to respective ends of the seat stays 12, a circular portion 132 connecting the remaining end of one straight portion 131 to an end of another straight portion 131, and a bar 133 connecting one straight portion 131 to another straight portion 131 at a substantially mid-length of each straight portion 131, and an arc-shaped tube 14 with one end thereof connected to the junction of the seat tube 11 and the two seat stays 12 and the other end thereof connected to the bar 133 of the U-shaped tube 13.

For the engagement of the auxiliary wheel set 70 to the U-shaped plate 13 which will be explained more fully hereinbelow, the U-shaped tube 13 is further provided with a semicircular plate 134 at the circular portion 132. The semicircular plate 134 has a hole 135 through a central part thereof. Preferably, the semicircular plate 134 is welded to the circular portion 132 of the U-shaped tube 13.

It should be noted that the construction of the seat stays 12 and the U-shaped tube 13 is such that the angle formed between the two is appreciably larger than 90 degrees so as to define a more stable and functional structure. Preferably, the angle between the seat stays 12 and the U-shaped tube 13 is larger than 100 degrees, and more preferably, about 105 degrees.

Although not limited thereto, it is preferable that all tubes or stays of the frame 10 are easily assembled and disassembled such that transportation or shipment of the parts can be accomplished conveniently and that the storage of the parts occupies less space. Each component of the frame 10 can be easily combined by screws, as depicted in FIG. 2, or like means.

Referring again to FIG. 2, the wheel 30 having its central axle 31 connected to the seat stays 12 includes a wheel body 32, a plurality of spokes 33, a tire 34 covering the wheel body 32. At the central axle 31, there are provided a first and a second protuberances 35 and 36 on each side thereof. The two protuberances 35 and 36, each having two holes along the length thereof, are provided for the engagement of the stays-12 and the tube 13. Each first protuberance 35 which extends in a substantially vertical direction is snugly fitted into the respective hollow seat stays 12 and each second protuberance 36 which extends in a substantially horizontal direction is snugly fitted into the respective ends of the hollow U-shaped tube 13.

It is appreciated that the protuberance 36 extends in a direction such that the angle formed between the first protuberance 35 and the second protuberance 36 is appreciably larger than 90 degrees, preferably, larger than 100 degrees, and more preferably, about 105 degrees, so as to conform with the construction of the seat stays 12 and the U-shaped tube 13.

A pair of pedals 40 is provided on the opposite sides of the wheel 30, as previously mentioned. This is accomplished by providing a pair of cranks 41 on the central axle 31 of the wheel 30 and then connecting the pedals 40 on respective ends of the pair of cranks 41.

Also referring to FIG. 2, the cover plate 50 is provided on the front part of the U-shaped tube 13 of the frame 10. The cover plate 50 is substantially flat except for its two ends which are formed in a slightly upswept manner. The cover plate 50 is incorporated into the skate bike mainly for beautifying purposes, i.e., to hide or cover the structure of the supporting shafts 60 which will be explained more fully hereinbelow. On the other hand, the provision of the cover plate 50 permits a user to stand on the skate bike and ride in a reverse direction.

Figure 3:
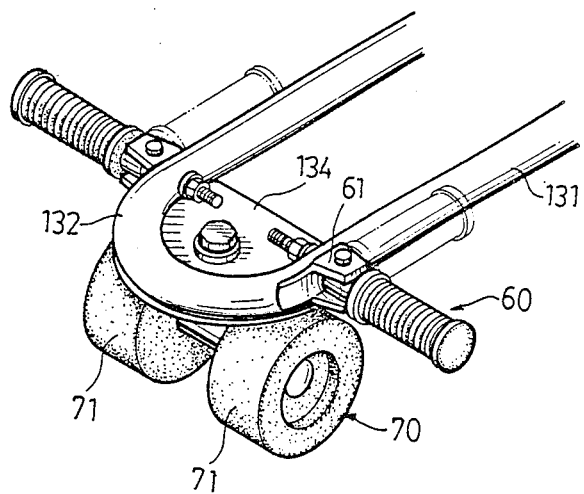
FIG. 3 is a fragmentary view illustrating a combination of a pair of supporting shafts with a U-shaped tube of the present invention.

Referring to FIGS. 2 and 3, it can be seen that the supporting shafts 60 are provided on the U-shaped tube 13 at a position substantially below the cover plate 50. Two hinging seats 61 are provided on respective straight portions 131 of the U-shaped tube 13 at a position proximate to the circular portion 132. The seat 61 is substantially a plate body having two extended portions each having a hole 62. The supporting shafts 60, each having a hole 63, are each pivotally connected to a respective seat 61 by passing a suitable fastener 64 through holes 62 and 63. The supporting shafts 60 are foldable with respect to the U-shaped tube 13. When not in use, the supporting shafts 61, being foldable, abut against the lateral part of the beginning part of the straight portions of the U-shaped tube 13 (as shown in dotted line in FIG. 3) and are hidden under the cover plate 50.

The auxiliary wheel set 70 is provided on a lower side of the U-shaped tube 13 at the position of the circular portion 132. The auxiliary wheel set 70 includes two wheel members 71, a rod 72 which connects one wheel member 71 to another wheel member 71, and an engaging member 73 which is provided for the engagement of the wheel set 70 to the U-shaped tube 13. The engaging member 73 has a hole 74 which is in alignment with the hole 135 of the semicircular plate 134. A bolt passes through the holes 135 and 74 and is fastened by nuts so as to fix the engagement therebetween.

Two ski poles 80 are provided to facilitate the skiing or sliding movement of the user. One ski pole 80 is shown in FIG. 2. The ski pole 80 includes an upright stick body 81. An end of the stick body 81 is encased with a cover 82 for comfortable gripping by the user, and the other end thereof is covered with soft material, more preferably, a soft plastic cap 83.

Figure 4:
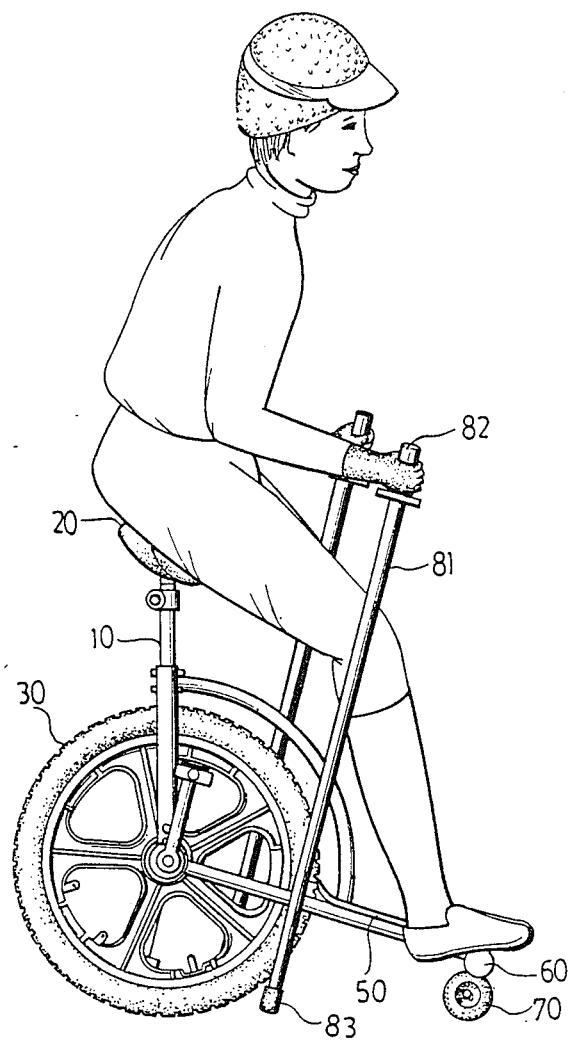
FIG. 4 is a view embodying the application of the skate bike of the present invention as a skating device.

With particular reference to FIG. 4, the way the skate bike of the invention is utilized can be seen. The sportsman, as shown, is sitting on the spring seat saddle 20 with his two feet stepping on the supporting shafts 60 and with his two hands holding the two ski poles 80. He can skate on icy area or grass field with the present device. Alternatively, the user may neglect the use of the ski poles 80 but ride on the present device with his feet paddling the pedals 40 (not shown).

While the present invention has been explained in relation to its preferred embodiment, it is to be understood that various modifications thereof will be apparent to those skilled in the art upon reading this specification. The invention disclosd herein is therefore intended to cover all such modifications as shall fall within the scope of the appended claims.

I claim:
1. A skate bike comprising:
a frame including a seat tube, two downwardly extending seat stays jointed to a lower end of said seat tube, a substantially horizontally extending U-shaped tube having two straight tube portions and a circular portion connecting an end of one straight tube portion to an end of the other straight tube portion, a bar connecting the straight tube portions of said U-shaped tube to each other at a substantially mid-length of each straight tube portion, and an arc-shaped tube with one end thereof connected to a junction of said seat tube and said two seat stays and the other end thereof connected to said bar;
a spring seat saddle connected to an uper part of said seat tube of said frame;
a wheel including a central axle connectable to said frame, a wheel body, a plurality of spokes, and a tire covering said wheel body, said central axle having a first protuberance substantially vertically formed on each side thereof for engaging with said seat stays of said frame and a second said protuberance substantially horizontally formed on each side thereof for engaging with said two straight tube portions of said U-shaped tube;
a pair of pedals connected to a pair of cranks which are formed on respective sides of said central axle of said wheel;
a cover plate provided on a front part of said U-shaped tube of said frame;
a pair of foldable supporting shafts pivotally provided on said U-shaped tube at a position substantially below said cover plate; and
an auxiliary wheel set provided on a lower side of said U-shaped tube at the position of said circular portion.

2. A skate bike as claimed in claim 1, wherein said U-shaped tube further comprises a semicircular plate at the circular portion and said semicircular plate has a hole through a central part thereof.

3. A skate bike as claimed in claim 2, wherein said semicircular plate is welded to said circular portion of said U-shaped tube.

4. A skate bike as claimed in claim 1, wherein said seat stays and said U-shaped tube define an angle exceeding 90 degrees therebetween.

5. A skate bike as claimed in claim 4, wherein the angle is larger than 100 degrees.

6. A skate bike as claimed in claim 5, wherein the angle is about 105 degrees.

7. A skate bike as claimed in claim 1, wherein the frame includes means permitting its assembly and disassembly.

8. A skate bike as claimed in claim 7, wherein said means includes screws.

9. A skate bike as claimed in claim 1, wherein each of said protuberances has two holes along the length thereof for receiving screws.

10. A skate bike as claimed in claim 4, wherein said first and second protuberances are formed to define an angle therebetween conforming with the angle defined by said seat stays and said U-shaped tube.

11. A skate bike as claimed in claim 1, wherein said cover plate is substantially flat and includes two slightly upswept ends.

12. A skate bike as claimed in claim 1, wherein said pair of supporting shafts are connected to two hinging seats which are provided on respective straight portions of said U-shaped tube adjacent to said circular portion.

13. A skate bike as claimed in claim 12, wherein each hinging seat includes a plate body having two extended portions, and each extended portion having a hole therethrough.

14. A skate bike as claimed in claim 1, wherein said auxiliary wheel set includes two wheel members, a rod connecting the wheel members, and an engaging member engaging the auxiliary wheel set to said U-shaped tube.

15. A skate bike as claimed in claim 1 further comprising a pair of ski poles.

16. A skate bike as claimed in claim 15, wherein each said ski pole includes an upright stick body, a cover encasing an end of said stick body, and a soft plastic cap covering another end of said stick body.

* * * * *